Patented May 28, 1940

2,202,704

UNITED STATES PATENT OFFICE 2,202,704

PROCESS FOR SYNTHESIZING THERAPEUTIC AGENTS AND PRODUCTS RESULTING THEREFROM

Russell Earl Marker and Thomas S. Oakwood, State College, Pa., assignors to Parke, Davis & Company, Detroit, Mich., a corporation of Michigan No Drawing. Application August 6, 1936, Serial No. 94,717

16 Claims. (Cl. 260—397)

The invention relates to a method for synthetically preparing an estrogenic compound, and more particularly to a compound which may be designated as a synthetic ketohydroxyestrin.

Prior to our invention ovarian hormones in crystalline form have been obtained from natural sources as described in United States Patents Nos. 1,967,350 and 1,967,351, both issued July 24, 1934. Our invention contemplates the synthesis of a ketohydroxyestrin from ergosterol by a series of steps forming thereby a series of intermediate compounds, some of which were heretofore unknown. This invention therefore relates not only to a new process but also to certain new compounds.

It is now generally accepted that the alpha ovarian hormone obtained from natural sources and designated as ketohydroxyestrin has a structural formula as represented below:

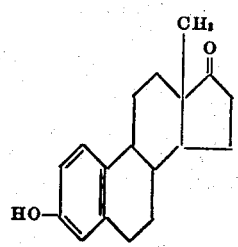

In accordance with our invention we have prepared a synthetic ketohydroxyestrin having high estrogenic activity from chemical compounds which in themselves have no estrogenic activity. We have also prepared derivatives from the synthetic ketohydroxyestrin which also have estrogenic activity. Further, we have prepared certain new intermediate compounds which are useful in the preparation of the synthetic ketohydroxyestrin and for other purposes. Among the new compounds which are included within the scope of this invention are the following:

1. Tetra-hydro-dehydro-neoergosterol
2. Acetate of tetra-hydro-dehydro-neoergosterol.
3. Synthetic ketohydroxyestrin.
4. Esters of synthetic ketohydroxyestrin.
5. The benzoate of synthetic ketohydroxyestrin.
6. Semicarbazone of synthetic ketohydroxyestrin.

In general, our method of synthesis comprises the following steps:

1. Preparation of ergopinacone from ergosterol.
2. Preparation of neoergosterol from ergopinacone.
3. Preparation of dehydro-neoergosterol from neoergosterol.
4. Preparation of tetra-hydro-dehydro-neoergosterol from dehydro-neoergosterol.
5. Preparation of synthetic ketohydroxyestrin from tetra-hydro-dehydro-neoergosterol.

Some of the steps in the synthetic preparation as given above were known prior to our invention, and it therefore falls within the purview of the present invention to use as a starting material for the synthesis such of the intermediate compounds as were known prior to our invention. Thus instead of starting the synthesis with ergosterol, it may begin with dehydro-neoergosterol prepared by methods heretofore disclosed in the literature.

In order that the invention may be completely disclosed, we will now describe a method of synthesis starting with the well known compound, ergosterol. The conversion of this compound into synthetic ketohydroxyestrin may be illustrated graphically as follows:

I. Ergosterol

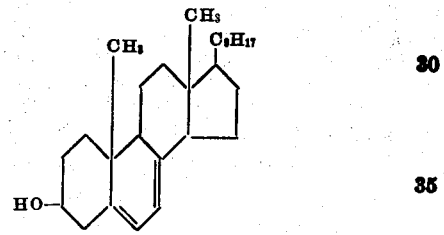

II. Neoergosterol

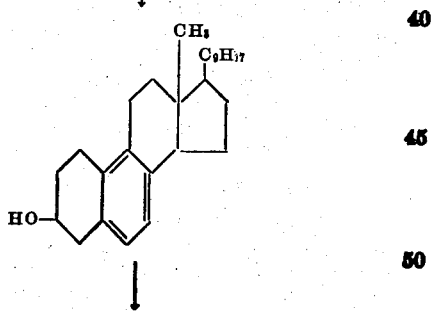

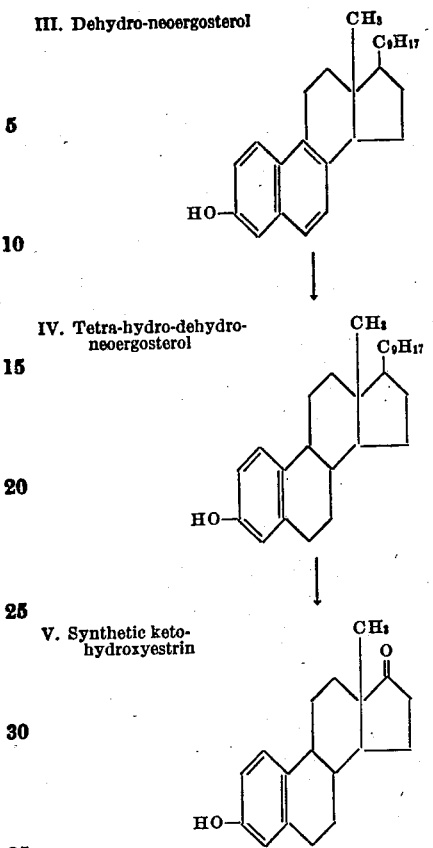

III. Dehydro-neoergosterol

IV. Tetra-hydro-dehydro-neoergosterol

V. Synthetic keto-hydroxyestrin

The preparation of ergopinacone

A solution of 7.2 g. of ergosterol and 7.2 g. of eosin in 1600 cc. of 95% alcohol and 200 cc. of benzene is placed in a 2 liter round bottom flask and boiled vigorously for 5 minutes on the steam bath. At the end of this time, the flask is stoppered securely while the boiling continues, and allowed to cool to room temperature. The flask is placed in the sunlight and allowed to stand from 4 to 10 days, depending upon the sunlight available. A white feathery precipitate forms on the walls of the flask within 10 minutes and it is necessary to shake the flask vigorously several times a day. At the end of the time required for complete decolorization of the eosin, the precipitate is filtered from the solution and washed with fresh alcohol and ether. A yield of 5 g. of ergopinacone is obtained having a melting point of 202–203° C. (uncorrected). In this way ergosterol is irradiated to give ergopinacone.

The preparation of neoergosterol

A mixture of 18.0 g. of ergopinacone and 180 cc. of dry decalin is placed in a Claisen flask and heated to the boiling point of the decalin over a period of 1½ hours. During this time, the solid dissolves in the decalin, with the evolution of methane (800 cc.). The decalin is then removed by vacuum distillation and the residue dissolved in 80 cc. of hot 95% alcohol. Cooling produces 5.5–6.2 g. of neoergosterol, a white crystalline product having a melting point of 150–152° C. (uncorrected).

The preparation of platinum black 60 g. of platinic chloride is dissolved in 100 cc. of water and 85 cc. of a 40% solution of formaldehyde is added. 120 g. of a 50% sodium hydroxide solution is then added dropwise with cooling in ice as considerable heat is liberated during the reaction. The mixture is allowed to stand twelve hours and the precipitated platinum-black filtered through a Buchner funnel, washed with water until the washings give no reaction with silver nitrate solution, and then dried in vacuo for forty-eight hours. The platinum-black is exposed to the air before use.

The preparation of dehydroneoergosterol

A stirred mixture of 12 g. of neoergosterol and 2 g. of platinum-black is placed in a 125 cc. distilling flask equipped with a tube for passing $CO_2$ through the flask and over the surface of the contents. The flask is heated in a sand bath to 180° and the melt is stirred with a platinum wire. The temperature is then raised to 230° in 15 minutes, forming bubbles and subliming a small amount of a white solid. The temperature is raised to 275° in 15 minutes more, causing violent frothing which continues while the temperature is raised to 300° in 15 minutes. The temperature is kept at 300° for an hour and the flask then cooled. The gelatinous solid is dissolved in ether and the platinum filtered. The ether is evaporated leaving a yellowish green oil with blue fluorescence. This oil is crude dehydroneoergosterol which may be used if desired in certain subsequent steps, or it may be first further purified. One method of purification is to dissolve the oil in 80 cc. of a saturated solution of picric acid in benzene by means of gentle warming. Standing over night in the icebox produces orange-red plates which are filtered and washed with a small amount of a saturated picric acid solution yielding 4.4 g. of a picrate. The picrate produced is dissolved in ether and the picric acid washed out with dilute ammonia. Evaporation of the ether gives a slightly colored crystalline solid which after one recrystallization from alcohol has a melting point of 147–50° C. This product is dehydroneoergosterol. The product by boiling with acetic anhydride gives an acetate having a melting point of 154–157° C.

The filtrate of the picrate formation also contains crude dehydroneoergosterol which may be used in subsequent steps if desired. The filtrate is dissolved in ether and the picric acid washed out with dilute ammonia. The ether benzene solution is then evaporated to dryness, leaving a greenish oil which again is crude dehydroneoergosterol.

Preparation of tetra-hydro-dehydro-neoergosterol 1 g. of the crystalline dehydroneoergosterol obtained as above is dissolved in 20 cc. of dry n-amyl alcohol and heated to boiling under a reflux condenser. To the solution, 1.2 g. of metallic sodium is added in small pieces over a period of 1½ hours. The solution is allowed to reflux for 3 hours and let stand over night. After the addition of 50 cc. of water, the amyl alcohol is distilled with steam, the residue acidified with dilute sulfuric acid and extracted with ether. The ether extract is washed with water and evaporated to dryness. The residue is crystallized twice from 95% alcohol, giving a yield of 0.5 gram of tetra-hydro-dehydroneoergosterol. This product melts at 170.5–171.5° C. and is a phenolic compound forming sodium salts. Analysis: Calculated for $C_{27}H_{41}O$; C, 85.1; H, 10.8; found C, 85.7; H, 10.8.

The product is preferably converted into the acetate for use in the subsequent step of conversion into the ketohydroxyestrin.

Since the yield of tetra-hydro-dehydroneoergosterol from the crystalline dehydroneoergosterol is small, it has been found desirable to utilize the crude dehydroneoergosterol previously mentioned. The crude product is in the form of a greenish oil. A solution of 21 g. of this oil in 350 cc. of dry n-amyl alcohol is heated to boiling with stirring under reflux. To the hot solution is added 25 g. of metallic sodium in small pieces over a period of 4 hours. Water is added, the amyl alcohol distilled with steam, the aqueous residue acidified and extracted with ether. The ether solution is evaporated to dryness and the total residue boiled for 1 hour with 60 cc. of freshly distilled acetic anhydride containing 10 g. of fused sodium acetate. The acetic anhydride is then distilled completely under reduced pressure. The resulting product is the crude acetate of tetra-hydro-dehydroneoergosterol.

*The preparation of ketohydroxyestrin from tetra-hydro-dehydroneoergosterol*

Either the acetate of the pure tetra-hydro-dehydroneoergosterol or the crude acetate previously mentioned is used in the oxidation step to obtain the ketohydroxyestrin. When using the crude acetate of tetra-hydro-dehydroneoergosterol it is dissolved in 30 parts of glacial acetic acid at 50° with stirring. During a period of 5 hours a solution of 2 parts of chromic oxide in 10 parts of 90% acetic acid is added at 50°, stirring and warming being continued for 7 hours, after which a small amount of methyl alcohol is added and the acetic acid removed by distillation under diminished pressure. After the addition of water the oxidation products are extracted with ether, the ether solution washed successively with 10% hydrochloric acid, water, saturated sodium bicarbonate solution, and finally again with water. The ether is evaporated and the residue, which is the crude acetate of ketohydroxyestrin, is saponified with alcoholic sodium hydroxide solution. After removal of the alcohol and acidification, the sterols are removed by ether extraction, dissolved in 95% alcohol and the ketone converted into its semicarbazone by the addition of one-fourth part of semicarbazide hydrochloride and an equal amount of sodium acetate, the solution being boiled during one hour and then allowed to stand overnight. A portion of the semicarbazone may crystallize out but an additional portion is obtained by distilling the alcohol, washing with water, and removing oily products by washing with liberal quantities of ether. After crystallization from 95% alcohol, the semicarbazone shows a melting point of 250–260° C.

The semicarbazone is hydrolyzed by heating its alcoholic solution with dilute sulfuric acid during one-half hour. The hydrolysis mixture is poured into water, the ketone extracted with ether and then sublimed in high vacuum at approximately 200° C. The sublimate is recrystallized from 95% alcohol.

*Synthetic ketohydroxyestrin*

This final compound is a synthetic ketohydroxyestrin. It is a white crystalline solid melting at 258–260° C. It is soluble in alkali. It gives a rotation of $$[\alpha]_D^{32} = +159°$$

in alcohol, c=514 mg. per 100 cc. Analysis: Calculated for $C_{18}H_{22}O_2$, C, 79.9; H, 8.3: found C, 79.4, H, 8.4.

When mixed with an equal weight of ketohydroxyestrin obtained from natural sources and melting at 254–256° C., it does not show an appreciable depression in melting point. The physical properties of the synthetic ketohydroxyestrin are very similar to those of ketohydroxyestrin isolated from natural sources. Preliminary physiological tests indicate the synthetic product to possess a high estrogenic activity approaching that of the naturally-occurring estrogenic hormones. The synthetic product is probably a closely related stereoisomer of the ketohydroxyestrin obtainable from pregnancy urine. The crystal structure of the synthetic product closely resembles the crystal structure of the natural product.

From synthetic ketohydroxyestrin, the semicarbazone is prepared by mixing two parts of the synthetic product with one part semicarbazide hydrochloride and one part sodium acetate and boiling with 95% alcohol. The alcohol is evaporated, the residue boiled with water, filtered and recrystallized from alcohol. The product thus obtained melts at 252–4° C. and is designated as the semicarbazone of synthetic ketohydroxyestrin. Analysis: Calculated for $(C_{19}H_{25}O_2N_3)_2 . H_2O$, C, 67.9; H, 7.9: found C, 68.1, H, 8.2. From the analysis this semicarbazone calculates to have one-half molecule of water of crystallization.

The esters of synthetic ketohydroxyestrin are prepared in the usual manner and are also new compounds. For example, the benzoate of synthetic ketohydroxyestrin is prepared by mixing 10 milligrams of the synthetic ketohydroxyestrin with 3 cc. of 10% sodium hydroxide and 0.025 g. of benzoyl chloride and shaking for 30 minutes. The precipitate is filtered, washed with water, dried and crystallized from 95% alcohol. The benzoate of synthetic ketohydroxyestrin has a melting point of 205–207° C. A mixture of this product with the benzoate of natural ketohydroxyestrin shows no depression of the melting point.

What we claim as our invention is:

1. In the process for preparing an estrogenic compound, the steps of reducing dehydroneoergosterol to tetra-hydro-dehydroneoergosterol with a reducing agent capable of adding four hydrogen atoms to ring B of dehydroneoergosterol without affecting the phenolic ring thereof, converting the 3-hydroxyl group of the reduction product to a group resistant to oxidation and capable of hydrolysis to give hydroxyl, and oxidizing the thus protected tetra-hydro-dehydroneoergosterol to an estrogenic compound.

2. In the process for preparing an estrogenic compound, the step of oxidizing the acetate of tetra-hydro-dehydroneoergosterol to the acetate of ketohydroxyestrin.

3. The process of preparing tetra-hydro-dehydroneoergosterol comprising reducing dehydroneoergosterol with nascent hydrogen obtained by interaction of an alkali metal and an alcohol.

4. The process of preparing tetra-hydro-dehydroneoergosterol comprising reacting dehydroneoergosterol with sodium and amyl alcohol, removing the amyl alcohol, acidifying, extracting with ether and crystallizing, thereby obtaining crystallized tetra-hydro-dehydroneoergosterol.

5. The process of preparing an estrogenic compound comprising reacting neoergosterol and platinum-black in the presence of carbon dioxide at a temperature up to 300° C., extracting with ether, filtering off the platinum, evaporating the ether leaving an oil, reacting said oil with sodium and amyl alcohol, removing the amyl alcohol, extracting the residue with ether, removing the ether, treating the residue with acetic anhydride and fused sodium acetate, removing the acetic anhydride thereby obtaining the acetate of tetra-hydro-dehydroneoergosterol, oxidizing said acetate with chromic oxide, extracting with ether, removing the ether thereby obtaining an acetate of ketohydroxyestrin, saponifying said acetate, extracting with ether and adding semicarbazide hydrochloride thereby obtaining semicarbazone of ketohydroxyestrin, hydrolyzing, extracting with ether and subliming in high vacuum to obtain synthetic ketohydroxyestrin.

6. The acetate of tetra-hydro-dehydroneoergosterol.

7. The process of preparing intermediate compounds useful for later conversion into estrogenic compounds, comprising reducing dehydroneoergosterol with a reducing agent capable of adding four hydrogen atoms to ring B of dehydroneoergosterol without affecting the phenolic ring thereof to obtain tetra-hydro-dehydroneoergosterol.

8. The process of preparing intermediate compounds useful for later conversion into estrogenic compounds, comprising reacting dehydroneoergosterol with metallic sodium in a solution of an alcohol thereby converting the same into tetra-hydro-dehydroneoergosterol.

9. Intermediate compounds useful for conversion into estrogenic compounds, comprising tetra-hydro-dehydroneoergosterol having the 3-hydroxyl protected against oxidation.

10. Tetra-hydro-dehydroneoergosterol.

11. A compound having the following formula

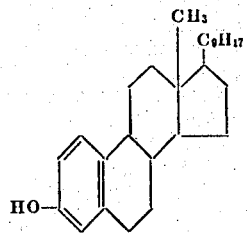

12. The carboxylic acid esters of tetra-hydro-dehydroneoergosterol.

13. A reduction product of dehydroneoergosterol capable of being oxidized by chromic acid to a ketohydroxy estrin compound.

14. A carboxylic acid ester of a reduction product of dehydroneoergosterol capable of being oxidized by chromic acid to an ester of ketohydroxy estrin.

15. In the process for preparing an estrogenic compound, the step of oxidizing a tetra-hydro-dehydroneoergosterol having the 3-hydroxyl group thereof protected against oxidation to obtain a ketohydroxy estrin derivative.

16. The process for preparing ketohydroxyestrin which comprises reducing dehydroneoergosterol to tetra-hydro-dehydroneoergosterol with a reducing agent capable of adding four hydrogen atoms to ring B of dehydroneoergosterol without affecting the phenolic ring thereof, converting the 3-hydroxyl group of the reduction product to a group resistant to oxidation and capable of hydrolysis to give hydroxyl, oxidizing the thus protected tetra-hydro-dehydroneoergosterol and saponifying the oxidation product to ketohydroxy estrin.

RUSSELL EARL MARKER.
THOMAS S. OAKWOOD.